US008948014B2

(12) United States Patent
Velamati et al.

(10) Patent No.: US 8,948,014 B2
(45) Date of Patent: Feb. 3, 2015

(54) SYSTEM AND METHOD FOR LOAD BALANCING MMES AND MME POOLS

(71) Applicants: Murali K. Velamati, Mountain View, CA (US); Jeffrey Furry, Chelsea (CA); Joël R. Calippe, San Jose, CA (US); Meena Selvam, San Jose, CA (US)

(72) Inventors: Murali K. Velamati, Mountain View, CA (US); Jeffrey Furry, Chelsea (CA); Joël R. Calippe, San Jose, CA (US); Meena Selvam, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 173 days.

(21) Appl. No.: 13/631,264

(22) Filed: Sep. 28, 2012

(65) Prior Publication Data
US 2013/0100813 A1 Apr. 25, 2013

Related U.S. Application Data

(60) Provisional application No. 61/549,166, filed on Oct. 19, 2011.

(51) Int. Cl.
| H04J 3/14 | (2006.01) |
| H04W 8/12 | (2009.01) |
| H04W 36/12 | (2009.01) |
| H04W 36/00 | (2009.01) |
| H04W 36/22 | (2009.01) |
| H04W 88/14 | (2009.01) |
| H04W 92/24 | (2009.01) |

(52) U.S. Cl.
CPC .............. *H04W 8/12* (2013.01); *H04W 36/12* (2013.01); *H04W 36/0033* (2013.01); *H04W 36/22* (2013.01); *H04W 88/14* (2013.01); *H04W 92/24* (2013.01)
USPC ........................................................ 370/237

(58) Field of Classification Search
CPC ..... H04W 24/08; H04W 28/08; H04W 36/22; H04W 64/00; H04W 72/042
See application file for complete search history.

(56) References Cited

U.S. PATENT DOCUMENTS

| 2010/0080186 | A1* | 4/2010 | Guo et al. ................. 370/329 |
| 2010/0124933 | A1* | 5/2010 | Chowdhury et al. ......... 455/453 |
| 2011/0032871 | A1 | 2/2011 | Xu et al. |
| 2011/0122779 | A1* | 5/2011 | Meirosu et al. .............. 370/252 |
| 2011/0122845 | A1* | 5/2011 | Meirosu et al. .............. 370/332 |
| 2011/0171979 | A1* | 7/2011 | Rune ........................ 455/458 |
| 2011/0269499 | A1* | 11/2011 | Vikberg et al. .............. 455/524 |
| 2012/0023360 | A1* | 1/2012 | Chang et al. ................ 714/4.11 |

FOREIGN PATENT DOCUMENTS

EP 2 265 054 A1 12/2010

OTHER PUBLICATIONS

Jan. 25, 2013 The International Search Report and the Written Opinion of the International Searching Authority, or The Declaration, in PCT/US2012/060271, Alcatel-Lucent USA Inc., Applicant, 11 pages.

* cited by examiner

*Primary Examiner* — Yong Zhou
(74) *Attorney, Agent, or Firm* — Wall & Tong, LLP

(57) ABSTRACT

A system, method and apparatus for policy-driven load balancing of MMEs and MME pools by migrating eNodeBs service responsibilities among MMEs and/or MME processing components or modules.

23 Claims, 5 Drawing Sheets

SYSTEM AND METHOD FOR LOAD
BALANCING MMES AND MME POOLS

CROSS-REFERENCE TO RELATED
APPLICATION

This application claims the benefit of U.S. Provisional Patent Application Ser. No. 61/549,166, filed Oct. 19, 2011, entitled SYSTEM AND METHOD FOR LOAD BALANCING MMEs and MME POOLS, which application is incorporated herein by reference.

FIELD OF THE INVENTION

The invention relates generally to communication networks and, more specifically but not exclusively, to Mobility Management Entity (MME) load balancing.

BACKGROUND

The Mobility Management Entity (MME) is a key control-node for a Long Term Evolution (LTE) network. The MME is responsible for idle mode UE (User Equipment) tracking and paging mobility management Entity (MME) procedures including retransmissions. The MME is involved in the bearer activation/deactivation process and for choosing the SGW for a UE at the initial attach and at time of intra-LTE handover involving Core Network (CN) node relocation. The MME is responsible for authenticating the user (by interacting with the HSS), for generation and allocation of temporary identities to UEs, for checking the authorization of a UE to camp on the service provider's Public Land Mobile Network (PLMN), for enforcing UE roaming restrictions and so on.

The MME is also the termination point in the network for ciphering/integrity protection for Non-Access Stratum (NAS) signaling and assist with security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

The process of migrating eNodeBs from one MME to another is done manually. For example, assuming a MME handles 12,000 eNodeBs and it is desired to move half of them to another MME, each of the eNodeBs must be manually reprovisioned to establish sessions with the other MME. This takes time and is error prone. While some tools may exist to help speed up the process, significant manual interaction is still required.

SUMMARY

Various deficiencies in the prior art are addressed by systems, methods and apparatus for policy-driven load balancing of MMEs and MME pools by migrating eNodeBs service responsibilities among MMEs and/or MME processing components or modules.

In various embodiments, in response to an indication that a particular MME is overloaded. Various embodiments are directed to monitoring indicia of eNodeB loading at a source MME and in response to the loading indicia exceeding a policy-defined threshold level, migrating responsibility for one or more eNodeBs to a target MME. Migration may be achieved via transmitting to the target MME a message adapted to cause the target MME to form links to the eNodeBs to be migrated; converting existing links between the eNodeBs to be migrated and the source MME to standby links; transmitting to the target MME state information associated with the eNodeBs to be migrated; and preventing the acceptance of new services at the source MME associated with the eNodeBs to be migrated.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Embodiments of the invention will be primarily described within the context of a Network Management System (NMS) and Mobility Management Entities (MME) within a Long Term Evolution (LTE) network. Those skilled in the art and informed by the teachings herein will realize that the various embodiments are also applicable to managing data objects associated with other types of wireless networks.

Figure 1:
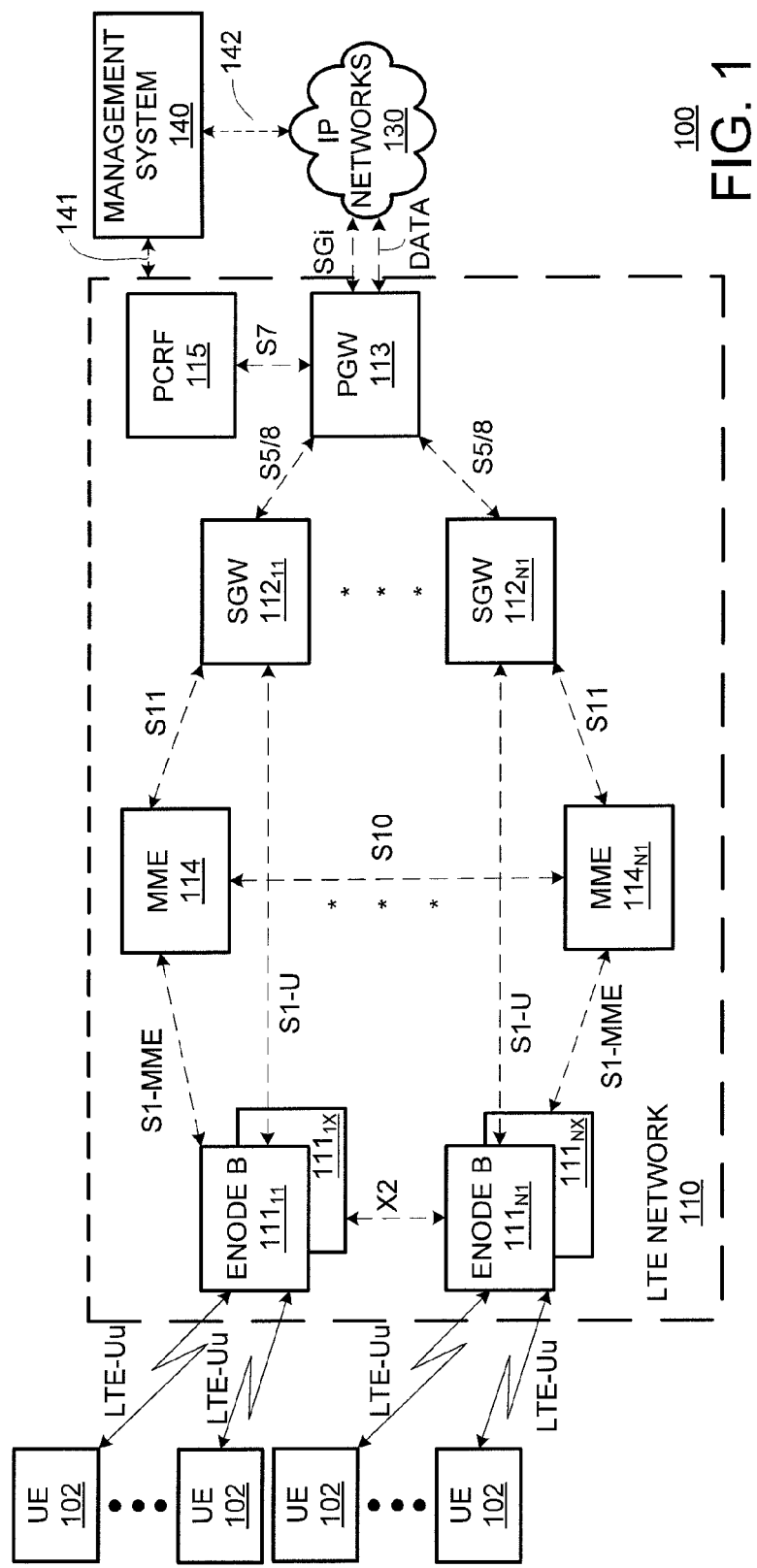
FIG. 1 depicts an exemplary wireless communication system including a management system according to an embodiment.

FIG. 1 depicts an exemplary wireless communication system including a management system according to an embodiment. Specifically, FIG. 1 depicts an exemplary wireless communication system 100 that includes a plurality of User Equipment (UE) or User Devices (UDs) 102, a Long Term Evolution (LTE) network 110, IP networks 130, and a management system (MS) 140.

The LTE network 110 supports communications between the UEs 102 and IP networks 130. The MS 140 is configured for supporting various management functions for LTE network 110 such as described with respect to the MS 400 of FIG. 4 and further as described herein.

The UEs 102 are wireless user devices capable of accessing a wireless network, such as LTE network 110. The UEs 102 are capable of supporting control signaling in support of bearer session(s). The UEs 102 may be a phone, PDA, computer, or any other wireless user device.

The configuration and operation of LTE networks will be understood by one skilled in the art. The exemplary LTE network 110 includes a plurality of eNodeBs $111_{11}$ through $111_{NX}$ (collectively, eNodeBs 111), a plurality of Serving Gateways (SGWs) $112_{11}$ through $112_{N1}$ (collectively, SGWs 112), at least one Packet Data Network (PDN) Gateway (PGW) 113, a plurality of Mobility Management Entities (MMEs) $114_1$ and $114_{N1}$ (collectively, MMEs 114), and at least one Policy and Charging Rules Function (PCRF) 115.

The eNodeBs 111, SGWs 112, PGW 113, MMEs 114, PCRF 115, as well as various LTE network components which have been omitted for purposes of clarity, cooperate to provide an Evolved Packet Core (EPC) network supporting end-to-end service delivery using IP.

The eNodeBs 111 provide radio access interface functions for the respective groups of UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The SGWs 112 support communications for various pluralities of eNodeBs 111. As depicted in FIG. 1, a first SGW 112 (denoted as SGW $112_{11}$) is depicted as supporting communications for a first plurality of eNodeBs 111 (denoted as eNodeBs $111_{11}$ through $111_{1X}$), while an $N^{th}$ SGW 112 (denoted as SGW $112_{N1}$) is depicted as supporting communications for an $N^{th}$ plurality of eNodeBs 111 (denoted as eNodeBs $111_{N1}$ through $111_{NX}$). The communication between the SGWs 112 and their respective eNodeBs 111 is supported using S1-u interfaces. The S1-u interfaces support per-bearer user plane tunneling and inter-eNodeB path switching during handover. It will be appreciated that the SGWs 112 may support more or fewer eNodeBs then indicated.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interlaces providing user and control plane connectivity between the SGW in the Visitor PLMN (VPLMN) and the PGW in the Home PLMN (HPLMN). The PGW 113 facilitates communications between LTE network 110 and IP networks 130 via, illustratively, an SGi interface.

The MMEs 114 support the eNodeBs 111 to provide mobility management functions in support of UEs 102. In particular, each MME is depicted as supporting a respective group of eNodeBs. For example, MME $114_{11}$ supports eNodeBs $111_{11}$-$111_{1X}$, MME $114_{21}$ (not shown) supports eNodeBs $111_{21}$-$111_{2X}$ and so on up to MME $114_{N1}$, which supports eNodeBs $111_{N1}$-$111_{NX}$. The communication between MMEs 114 and eNodeBs 111 is supported using respective S1-MME interfaces, which provide control plane protocols for communication between the MMEs 114 and the eNodeBs 111.

The eNodeBs 111 supported by a particular MME 114 may change. In the various embodiments, the group of eNodeBs supported by an MME may change over time, the eNodeBs within a particular group of eNodeBs may change over time and so on. Generally speaking, each MME 114 is capable of supporting some number of eNodeBs 111, some number of subscribers, some number of services and the like.

Generally speaking, each MME 114 is associated with a finite number of eNodeBs as indicated in FIG. 1 and discussed in more detail herein. Further, the various MMEs 114 depicted herein may be organized as one or more groups of MMEs. At times, a particular MME or MME pool may become over utilized resulting in an imbalance of MME usage (e.g., an event occurs that spikes traffic such as a trade show, presidential visit and the like). In this case, some number of eNodeBs must be migrated from the overutilized MME(s) to one or more underutilized MMEs (in the same pool or a different pool) to perform a load balancing function with respect to the MMEs.

In various embodiments the MMEs 114 depicted herein may be organized as one or more pools of MMEs, where each pool of MMEs operates to perform various load balancing functions with respect to supported eNodeBs as will be described more detail below. Specifically, a plurality of MMEs may also be provided within a pool of MMEs. Multiple pools of MMEs may also be provided. Each MME can handle a finite number of eNodeBs, and typically does so within a particular geographic region. Thus, in various embodiments, a number of MME pools may be provided where each MME pool includes, illustratively, eight MMEs. Thus, a first MME pool includes $MME_{11}$-$MME_{18}$, a second MME pool includes $MME_{21}$-$MME_{28}$ and so on through an Nth pool including $MME_{N1}$-$MME_{N8}$.

The various MMEs within a pool of MMEs are aware of each other and able to decide as a group which of the MMEs within the pool should accept the bulk of new sessions (i.e., which MME has the most capacity to accept sessions). New sessions may be allocated among the pool MMEs via a round robin or other distributed assignment technique, via a relative utilization level decision and so on. Network management control provide additional options in terms of eNodeB migration within and between MME pools, as will be discussed in more detail below.

The PCRF 115 provides dynamic management capabilities by which the service provider may manage rules related to services provided via LTE network 110 and rules related to charging for services provided via LTE network 110.

As depicted in FIG. 1, elements of LTE network 110 communicate via interfaces between the elements. The interfaces described with respect to LTE network 110 also may be referred to as sessions.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities. An exemplary management system suitable for use as MS 140 of FIG. 1 is depicted and described herein with respect to FIG. 2.

Figure 2:
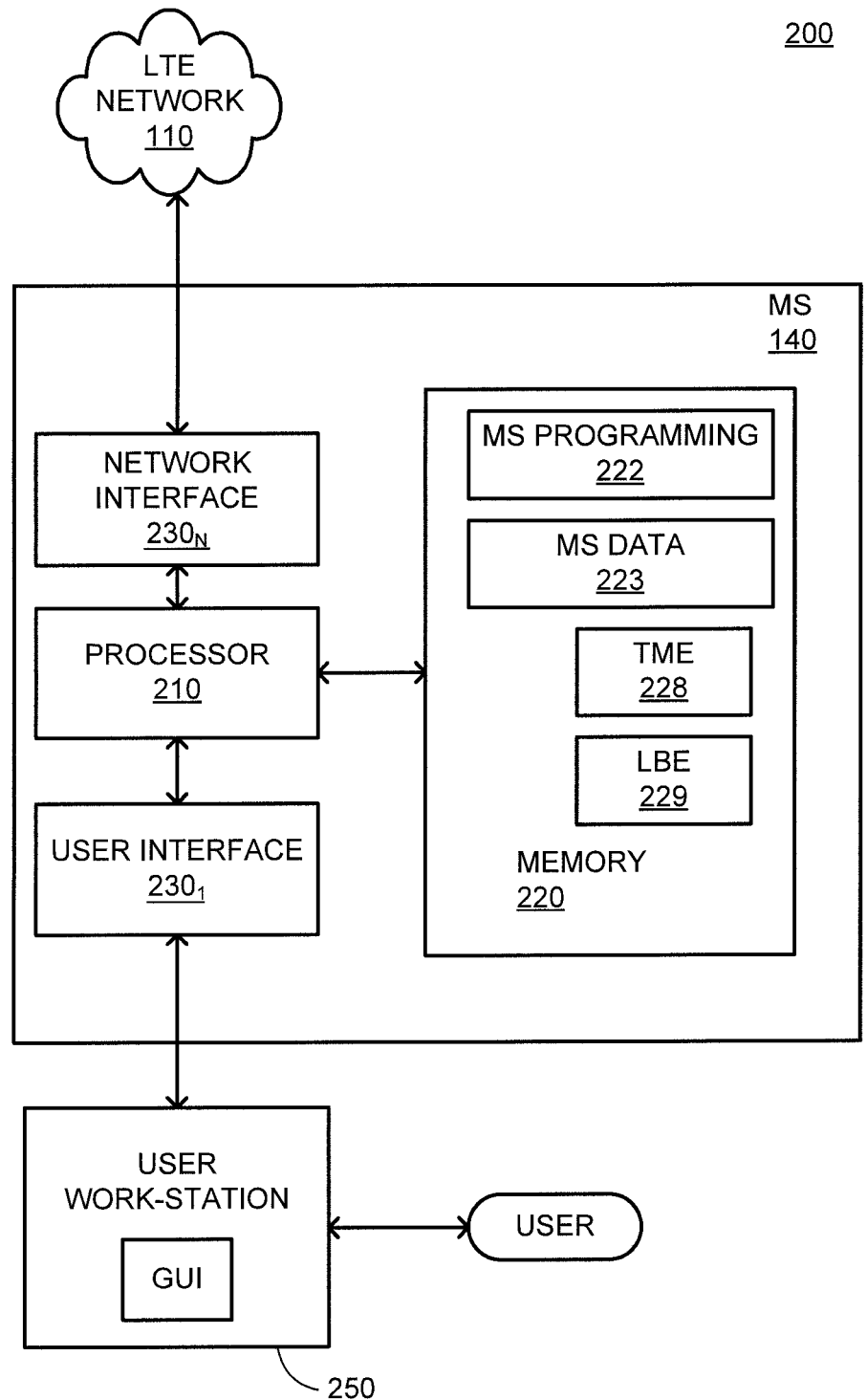
FIG. 2 depicts an exemplary management system suitable for use as the management system of FIG. 1.

FIG. 2 depicts an exemplary management system suitable for use as the management system of FIG. 1. As depicted in FIG. 2, MS 140 includes one or more processor(s) 210, a memory 220, a network interface 230N, and a user interface 230I. The processor(s) 210 is coupled to each of the memory 220, the network interface 230N, and the user interface 230I.

The processor(s) 210 is adapted to cooperate with the memory 220, the network interface 230N, the user interface 230I, and the support circuits 240 to provide various management functions for LTE network 110.

The memory 220, generally speaking, stores programs, data, tools and the like that are adapted for use in providing various management functions for LTE network 110. The memory includes various management system (MS) programming module 222 and MS databases 223 adapted to implement network management functionality such as discovering and maintaining network topology, supporting various mobile services and the like. In addition, the memory 220 includes a Threshold Monitoring Engine (TME) 228, and a Load Balancing Engine (LBE) 229.

In one embodiment, the MS programming module 222, TME 228 and LBE 229 are implemented using software instructions which may be executed by processor (e.g., processor(s) 210) for performing the various management functions depicted and described herein.

The network interface 230N is adapted to facilitate communications with various network elements, nodes and other entities within the LTE network 110 to support the management functions performed by MS 140.

The user interface 230I is adapted to facilitate communications with one or more user workstations (illustratively, user workstation 250), for enabling one or more users to perform management functions for LTE network 110.

As described herein, memory 220 includes the MS programming module 222, MS databases 223, TME 228 and LBE 229 which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

The MS programming 222 adapts the operation of the MS 140 to manage the above-described network elements including the UEs 102, eNodeBs 111, Serving Gateways (SGWs) 112, Packet Data Network (PDN) Gateway (PGW) 113, Mobility Management Entities (MMEs) 114, and Policy and Charging Rules Function (PCRF) 115, various other network elements (not shown) as well as the various communication links there between. The MS databases 223 are used to store topology data, network element data, service related data and any other data related to the operation of the management system 140. The MS program 222 may implement various service aware manager (SAM) or network manager functions.

The TME 228 and LBE 229 implement various MME load balancing embodiments such as described herein. The TME 228 and LBE 229 cooperate with the MS programming 222 to receive status, loading and/or other operational data pertaining to the MMEs 114 within the LTE network 110. The TME 228 operates to determine whether one or more MME load threshold levels have been exceeded such that a load balancing procedure is appropriate. If load balancing is appropriate, the LBE 229 implements a load balancing procedure and communicates policies to the MMEs 114 adapted to cause the MMEs 114 to implement to achieve a desired eNodeB service load for one or more MMEs 114 or processing modules within the MMEs 114.

In various embodiments the threshold monitoring engine (TME) is used to implement various threshold monitoring and management processes such as determining whether one or more monitor parameters have reached a particular threshold level. Similarly, the load balancing engine (LBE) is used to implement various load balancing processes such as interacting with neighboring MMEs, the network management system and/or other network elements to shift or migrate serviced eNodeBs between MMEs (inter-MME load balancing) or between processor/routing entities within an MME (intra-MME load balancing).

Within the context of a network management implementation, the threshold monitoring engine (TME) 228 operates to check current loading levels for all MMEs in a pool of MMEs (e.g., a number of MMEs service a specific geographic area, or adapted for temporary service spikes such as trade shows and so on). This is a SAM-specific object that is associated with each pool of MMEs. It computes and aggregates all the information of the MMEs associated with a particular pool. Multiples of such pool objects may be processed by SAM to gain an understanding of the pool availability levels. In one embodiment, one TME monitors all of the MME pools.

In operation, policies or preferences of a network or system operator are used to define levels at which MMEs within the network are considered to be overloaded. Network policy may provide a specific over utilization level, such as 60%, 75%, and 90% and the like to represent utilization threshold levels of different urgency or concern.

The policies may define a specific parameter to be monitored in determining whether or not a threshold level has been reached. Network policy may define one or more parameters directly indicative of MME utilization level. Network policy also define a relationship between multiple factors which is used to determine thereby MME utilization level. In any event, indicia of utilization level is processed to determine whether or not a threshold utilization level has been reached by one or more MMEs or processing elements/modules within an MME.

Different MMES and/or MME pools may be associated with different policies. For example, more robust or reliable MMEs may be allowed to operate at a higher utilization level than other MMEs. Similarly, MMEs associated with customers that can tolerate service disruption (or won't pay for redundancy or improve service levels) may also be allowed to operate at a higher utilization level (e.g., 90%) prior to migrating eNodeB loads. By contrast, MMEs associated with customers that require redundancy and/or high quality service levels may be light will operate at a lower utilization level (e.g., 50%) prior to migrating eNodeB loads.

Status, alarm or other operational data associated with the MMEs or MME pools is monitored and compared to the policy data and/or thresholds defined by the policy data, which itself may be updated as necessary. When a comparison indicates an overutilization condition (however defined), the TME uses policy information to determine which eNodeBs from which MMEs should be migrated to which target MMEs and in what order etc. Each MME may be associated with a "next" or "target" MME for this purpose. Each MME may be associated with a sequence of potential next or target MMEs (e.g., select a "next best" MME according to some policy-driven criteria).

In various embodiments, policy defined threshold levels are derived by processing multiple MME status indicators to predict thereby an imminent overutilization condition.

In various embodiments, the source and target MMEs comprise different processing elements or modules within a single MME. In various embodiments, the source and target MMEs comprise different MMEs within a pool of MMEs. In various embodiments, the source and target MMEs comprise MMEs within different pools of MMEs. In various embodiments, the source and/or target MMEs may provide some combination of intra-MME processing elements or modules, inter-MME and/or inter-MME pool migrations.

Figure 3:
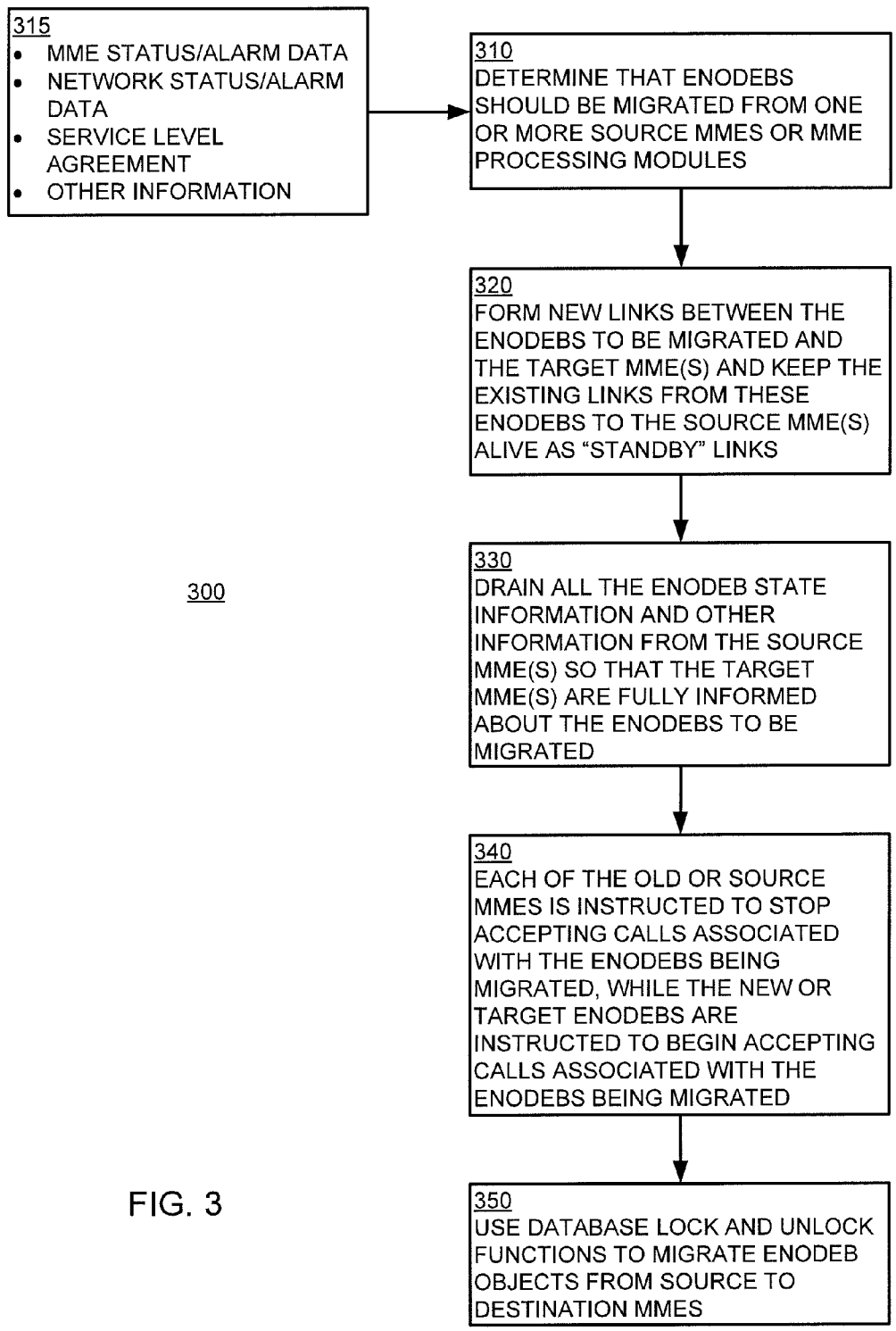
FIG. 3 depicts a flow diagram of a method according to one embodiment.

FIG. 3 depicts a flow diagram of a method according to one embodiment. Specifically, FIG. 3 depicts a method 300 in which a load balancing engine (LBE) 229 is invoked in response to a signal from the threshold monitoring engine (TME) indicative of a MME reaching a threshold level requiring load-balancing actions. The LBE 229 responsively migrates eNodeB support responsibilities.

At step 310, a determination is made that eNodeBs should be migrated from one or more source MMEs or MME processing modules. Referring to box 315, this determination is made with respect to MME status/alarm data, network status/alarm data, network operator policies, service level agreement (SLAs) and/or other information.

In various embodiments, one or more target MMEs are defined for each MME so that "keep alive" information and/or other information may be transferred between the MMEs. In this manner, and MME experiencing an overload condition may rapidly migrate eNodeBs to a next one of a prioritized sequence of target MMEs.

At step 320, new links between the eNodeBs to be migrated from one or more source MMEs to one or more target MMEs are formed, while keeping the existing links from these eNodeBs to the source MMEs alive for the moment by making these old links "standby" links.

The new links may comprise links to one or more individual target MMEs or target MME pools. In the case of a pool-level target, pool management entities will handle distribution of the new links among the MME members of the pool. The new links are formed but not yet enabled, so they do not yet support calls between eNodeBs and MMEs.

The old links are given a "standby" or other status such that new connections or calls are not accepted by the one or more source MMEs served by the old links. It is noted the eNodeBs may still try to use these links but will fail to do so, resulting in the use of backup MMEs and the like.

Also at step 320, various checkpoints and validations are performed. Specifically, during the formation of the new links, utilization or other data associated with the new links may also be gathered such that a comparison between potential target MMEs may be made to find a "next best" MME or MME pool. In some cases, the target MME may be overutilized already or may become overutilized should the number of eNodeBs to be migrated all connect to the target MME. This intermediate processing step is directed to assuring that the migration solution initially derived by the LBE is still valid or useful.

In one embodiment, this checkpoint/validation is fully automatic. An alternate migration plan exists (default or policy driven) that adapts the migration should certain criteria be met or not met.

In one embodiment, this checkpoint/validation is manual or only partially automatic. If certain criteria be met or not met, an error or warning is issued to a network operator indicating that the migration should be examined in more detail by the operator. An alternate migration plan may then be selected by the operator.

At step 330, the method initiates a process to drain all the eNodeB state information and other information from the source MME(s) so that the target MME(s) are fully informed about the eNodeBs to be migrated. This is a two step process; namely, (1) stop taking new calls and (2) migrate the user context (e.g., dynamic user data and other user data, typical SGW used by user, typical user data/call path, PCRF rules for user, authentication data, data plan parameters, roaming information, visiting information, home information, user call routing preferences and the like) and related data from the one or more source MMEs to the one or more target MMEs or MME pool.

At step 340, each of the old or source MMEs is instructed to stop accepting calls associated with the eNodeBs being migrated, while the new or target eNodeBs are instructed to begin accepting calls associated with the eNodeBs being migrated. For example, the new links established at step 310 are activated.

At step 350, database lock and unlock functions are used to ensure that the migration of eNodeB representative objects from source to destination MME(s) is performed in a manner avoiding conflicts such that calls, video streams and/or other mobile services may be routed with the migrated eNodeBs to the new MME(s).

Before, during and/or after the migration, the LBE provides additional information to the management system including (a) statistics, (b) alarms, (c) event and (d) monitoring data. In this manner, service impact or disruption to eNodeB users is avoided or minimized while user services are migrated along with their respective eNodeBs between MME cards, MMEs or MME pools.

The various embodiments described herein contemplate a policy driven MME load balancing methodology wherein a network management system (NMS) or other management entity implements MME load balancing policy by defining MME pools, selecting monitoring parameters indicative of resource utilization, performance/threshold levels indicative of overutilization or near-overutilization levels and so on.

The contemplated policy-based mechanism adapts the operation of individual MMEs and/or groups of MMEs in a manner consistent with network management objectives. Different MMEs may receive different policy parameters. Different policy parameters may be applied to different eNodeBs based upon subscriber type, data type, service level agreement (SLA), service provider information and the like. Thus, the policy defined threshold level for each of the MMEs may be adapted in response to one or more of subscriber type, service type and service level agreement (SLA) associated with users of respective supported eNodeBs.

In various embodiments, a network management level policy is implemented to load into an MME. An automatic load balancing engine is operable to offload/migrate eNodeBs supporting various UEs to be managed by other MMEs. For example, alarms associated with particular MMEs within a pool of MMEs, within control cards of an MME, and the like may be associated with a redistribution flag defined by management policy such as a "MME pool load balancing policy" executed by a network management system. For example, the network management system may cause one or more MMEs to operate in an autonomous manner to load balance eNodeB service requirements between themselves or between other MMEs.

In various embodiments, a network management level policy is implemented to automatically migrate eNodeBs to other MMEs or MME pools in response to trigger conditions such as utilization levels above a threshold level. The policy identifies for each source MME the various threshold levels (e.g., percent utilization level(s) to trigger a migration), the target MME(s) or MME pool and so on.

In various embodiments, a network management level policy is implemented to enable inter-pool migration where MMEs within the same pool of MMEs are aware of each other but not aware of MMEs within different pools. In particular, a policy denoted as "MME pool load balancing policy" and executed via the Network Management System (e.g., Service Aware Manager) provides sufficient information to the relevant MMEs to enable inter-pool migration of eNodeBs. The policy may be used to adapt default policies such as might include threshold levels (%), target or migrations destination MMEs and the like.

Various management control of the MMEs within the network may be exerted via policies. For example, the specific parameters defining overutilization of a particular MME card, MME or MME group may be adapted as needed via policy. Moreover, the specific actions to be taken in response to overutilization may also be adapted. In addition target migration MMEs and/or pools may be adapted, individual or node-specific parameters may be modified and so on.

The above-described embodiments are primarily directed toward embodiments wherein the threshold monitoring engine (TME) and load balancing engine (LBE) are implemented for instantiated as the management system level. In various other embodiments, one or both (or portions thereof) of the TME and LBE functionality are implemented at one or more of the MMEs 114.

Thus, in various embodiments, the TME/LBE functionality is implemented in whole or in part at one or more MMEs 114 to provide a local autonomous or semiautonomous mechanism to load balance eNodeB service requirements among the various MMEs 114 or the processing modules within the MMEs 114.

In various embodiments, policy-based instructions provided to MMEs by the network manager operate to define for the MMEs appropriate actions to take in the event of the eNodeB loading above the threshold level. The policy-based instructions may define one or more threshold levels associated with one or more monitor parameters. Generally speaking, the monitored parameters relate to eNodeB loading of an MME and the threshold levels are adapted in response to desired loading outcomes. The desired loading outcomes may be defined by a network management system, may be defined by MMEs within a pool of MMEs based upon some criteria, may be defined by default conditions programmed into the MMEs and so on.

Thus, in various embodiments, a network manager (NM) is adapted to monitor indicia of eNodeB loading at each of a plurality of MMEs within a network. In various embodiments, the NM is adapted to determine if the loading indicia exceeding a policy-defined threshold. In various embodiments the MN adapts MME operation via a policy mechanism.

In various embodiments, a MME is adapted to monitor indicia of eNodeB loading and determine if the loading indicia exceeds a policy-defined threshold. In various embodiments, the MME communicates with one or more neighboring MMEs to negotiate a migration of eNodeBs thereto. In various embodiments, the MME and neighboring MMEs form a MME pool, wherein at least some of the MMEs within the pool operate to manage eNodeB loading associated with the MME members of the pool.

Figure 4:
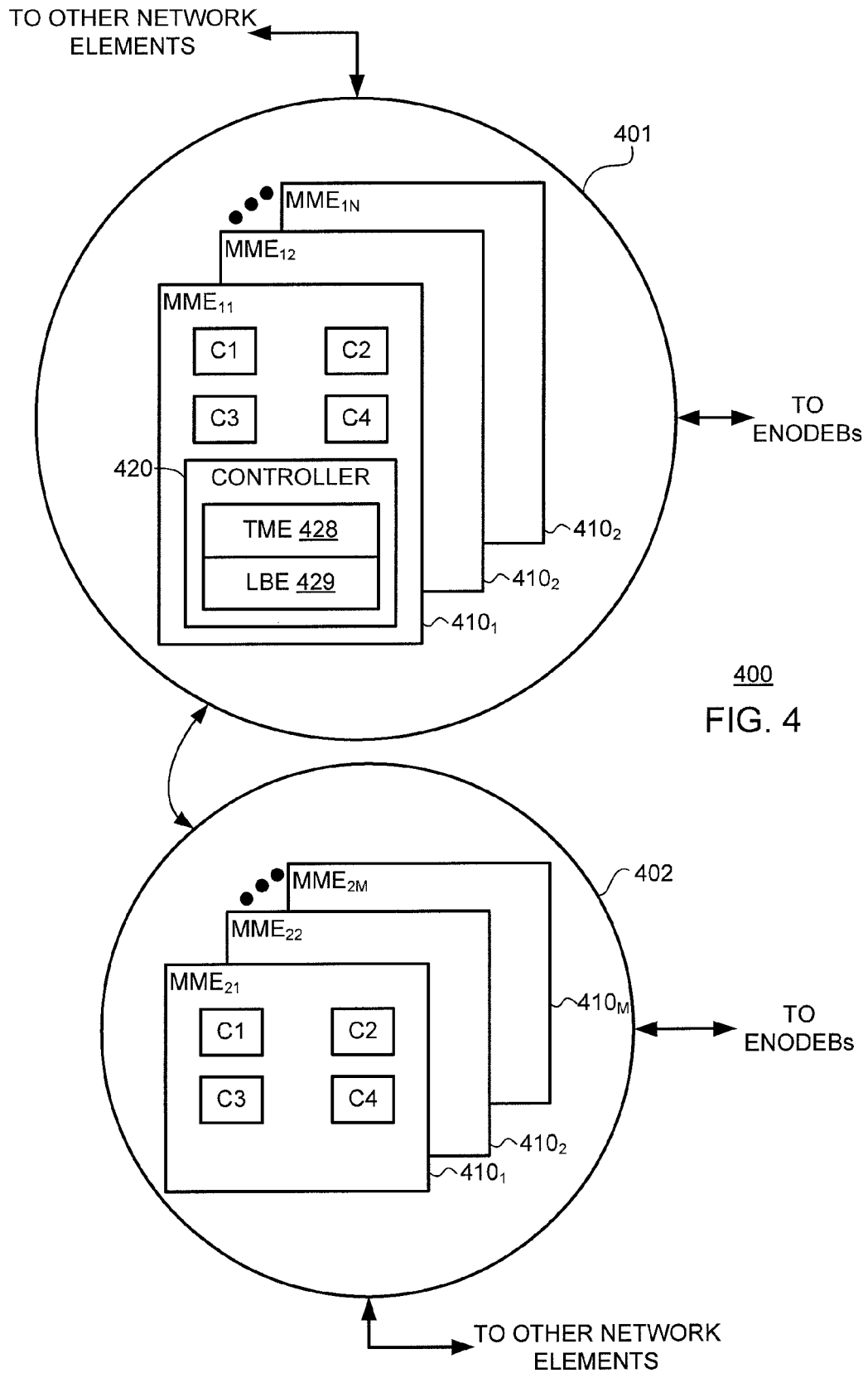
FIG. 4 depicts a graphical representation of a plurality of MME pools.

FIG. 4 depicts a graphical representation of a plurality of MME pools. Specifically, FIG. 4 depicts a first MME pool 401 and a second MME pool 402. Since the first and second MME pools 401 and 402 operate in substantially the same way, only the first MME pool 401 will be described in detail.

The first MME pool comprises a plurality of MMEs denoted as $410_1$, $410_2$ and so on up to $410_N$ (collectively first pool MMEs 410) and a second MME pool 402. Each of the MMEs 410 is depicted as including four internal cards for supporting eNodeB operations, denoted as C1-C4. It will be appreciated that more or fewer cards may be included within a particular MME. Each of the MMEs 410 is also depicted as including a controller card 420 including processing, input-output and memory functionality (not shown) capable of supporting a threshold management engine (TME) 428 and a load balancing engine (LBP) 429. The controller cards may be implemented in a manner similar to that described herein with respect to the relevant portions of the MS 140 described above with respect to FIG. 2 and/or the computing device described below with respect to FIG. 5. The TME 428 and LBP 429 operates in substantially the same manner as described above with respect to the TME 228 and LBE 229 discussed above with respect to FIG. 2.

Figure 5:
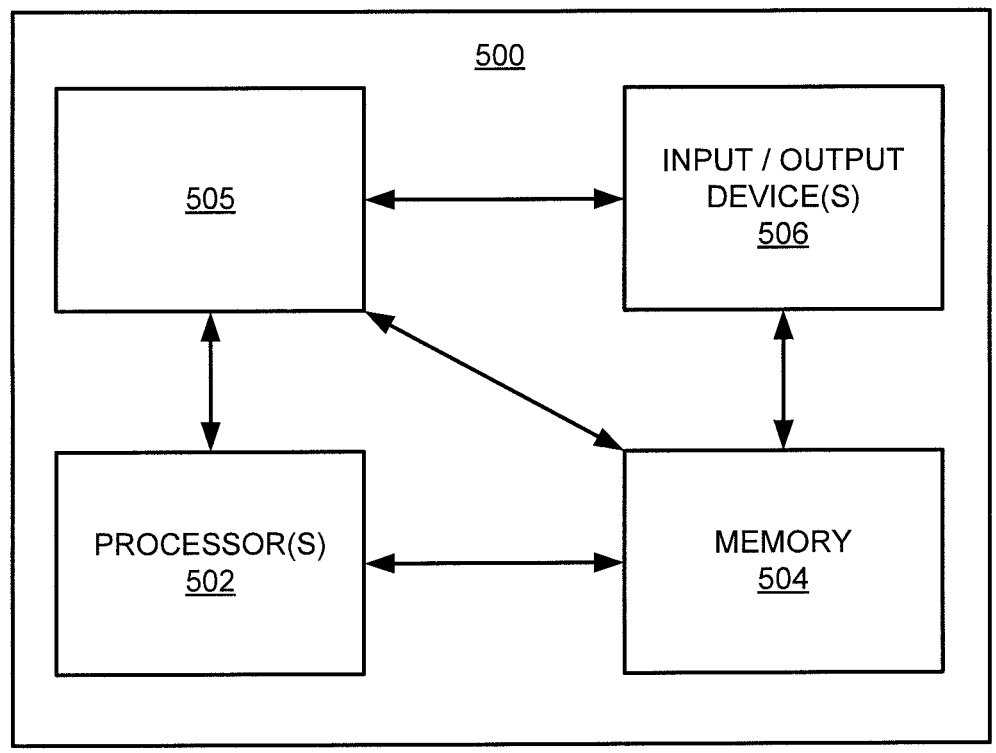
FIG. 5 depicts a high-level block diagram of a computer suitable for use in performing functions described herein.

FIG. 5 depicts a high-level block diagram of a computer suitable for use in performing functions described herein.

As depicted in FIG. 5, computer 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. A method for managing mobility management entities (MME) loading, comprising:
   monitoring indicia of eNodeB loading at a source MME and individually at each of a plurality of processing elements in said source MME; and
   in response to said loading indicia exceeding one or more of policy-defined threshold levels for said source MME and said plurality of processing elements in the source MME, migrating responsibility for one or more eNodeBs to one or more of: a target MME and a target processing element of the source MME.

2. The method of claim 1, wherein said migrating comprises:
   transmitting to the target MME a message adapted to cause the target MME to form links to the eNodeBs to be migrated;
   converting existing links between the eNodeBs to be migrated and the source MME to standby links;
   transmitting to the target MME state information associated with the eNodeBs to be migrated; and preventing the acceptance of new services at the source MME associated with the eNodeBs to be migrated.

3. The method of claim 1, further comprising transmitting to the target MME user context information associated with the eNodeBs to be migrated.

4. The method of claim 3, wherein the user context information comprises, for each respective user, information related to one or more of a typical Service Gateway (SGW) used, a typical user data/call path, PCRF rules, authentication data, data plan parameters, roaming information, visiting information, home information and user call routing preferences.

5. The method of claim 1, wherein said source and target MMEs comprise different processing elements within a single MME.

6. The method of claim 1, wherein said source and target MMEs comprise different MMEs within a pool of MMEs.

7. The method of claim 1, wherein said source and target MMEs comprise MMEs within different pools of MMEs.

8. The method of claim 1, wherein said indicia of eNodeB loading and said threshold level are defined by policy information received from a network management system.

9. The method of claim 1, wherein a network manager (NM) is adapted to perform said monitoring of indicia of eNodeB loading at each of a plurality of MMEs within a network.

10. The method of claim 9, wherein said NM is further adapted to perform said determine if said loading indicia exceeding a policy-defined threshold.

11. The method of claim 10, wherein said MN adapts MME operation via a policy mechanism.

12. The method of claim 1, wherein a MME is adapted to perform said monitoring of indicia of eNodeB loading and determine if said loading indicia exceeds a policy-defined threshold.

13. The method of claim 12, wherein said MME communicates with one or more neighboring MMEs to negotiate a migration of eNodeBs thereto.

14. The method of claim 13, wherein said MME and said neighboring MMEs form a MME pool, wherein at least some of the MMEs within the pool operate to manage eNodeB loading associated with the MME members of the pool.

15. The method of claim 1, wherein the policy-defined threshold level for each MME is based upon one or more of subscriber type, service type and service level agreement (SLA) associated with users of respective supported eNodeBs.

16. The method of claim 1, wherein the policy defined threshold level is derived by processing multiple MME status indicators to predict thereby an imminent over utilization condition.

17. The method of claim 1, further comprising:
defining for each MME one or more target MMEs;
causing each MME to communicate "keep alive" information with each of its respective one or more target MMEs; and
adapting eNodeB migration according to a target MME priority sequence.

18. An apparatus for managing mobility management entities (MME) loading, the apparatus comprising:
a processor configured for:
monitoring indicia of eNodeB loading at a source MME and individually at each of a plurality of processing elements in said source MME; and
in response to said loading indicia exceeding one or more of policy-defined threshold levels for said source MME and said plurality of processing elements in the source MME, migrating responsibility for one or more eNodeBs to one or more of: a target MME and a target processing element of the source MME.

19. A non-transitory computer readable storage medium storing instructions which, when executed by a computer, cause the computer to perform a method for managing mobility management entities (MME) loading, comprising:
monitoring indicia of eNodeB loading at a source MME and individually at each of a plurality of processing elements in said source MME; and
in response to said loading indicia exceeding one or more of policy-defined threshold levels for said source MME and said plurality of processing elements in the source MME, migrating responsibility for one or more eNodeBs to one or more of: a target MME and a target processing element of the source MME.

20. A non-transitory computer program product wherein computer instructions stored in a non-transitory computer readable memory, when processed by a computer, adapt the operation of the computer to provide a method for managing mobility management entities (MME) loading, comprising:
monitoring indicia of eNodeB loading at a source MME and individually at each of a plurality of processing elements in said source MME; and
in response to said loading indicia exceeding one or more of policy-defined threshold levels for said source MME and said plurality of processing elements in the source MME, migrating responsibility for one or more eNodeBs to one or more of: a target MME and a target processing element of the source MME.

21. The apparatus of claim 18, wherein said migrating comprises:
transmitting to the target MME a message adapted to cause the target MME to form links to the eNodeBs to be migrated;
converting existing links between the eNodeBs to be migrated and the source MME to standby links;
transmitting to the target MME state information associated with the eNodeBs to be migrated; and
preventing the acceptance of new services at the source MME associated with the eNodeBs to be migrated.

22. The non-transitory computer readable storage medium of claim 19, wherein said migrating comprises:
transmitting to the target MME a message adapted to cause the target MME to form links to the eNodeBs to be migrated;
converting existing links between the eNodeBs to be migrated and the source MME to standby links;
transmitting to the target MME state information associated with the eNodeBs to be migrated; and
preventing the acceptance of new services at the source MME associated with the eNodeBs to be migrated.

23. The non-transitory computer program product of claim 20, wherein said migrating comprises:
transmitting to the target MME a message adapted to cause the target MME to form links to the eNodeBs to be migrated;
converting existing links between the eNodeBs to be migrated and the source MME to standby links;
transmitting to the target MME state information associated with the eNodeBs to be migrated; and
preventing the acceptance of new services at the source MME associated with the eNodeBs to be migrated.

* * * * *